United States Patent
Hong

(10) Patent No.: US 7,446,844 B2
(45) Date of Patent: Nov. 4, 2008

(54) ARRAY SUBSTRATE AND DISPLAY APPARATUS HAVING THE SAME

(75) Inventor: Won-Kee Hong, Seoul (KR)

(73) Assignee: Samsung Electronics Co., Ltd. (KR)

( * ) Notice: Subject to any disclaimer, the term of this patent is extended or adjusted under 35 U.S.C. 154(b) by 273 days.

(21) Appl. No.: 11/408,713

(22) Filed: Apr. 21, 2006

(65) Prior Publication Data

US 2007/0045516 A1    Mar. 1, 2007

(30) Foreign Application Priority Data

Aug. 24, 2005 (KR) .................. 10-2005-0077609

(51) Int. Cl.
*G02F 1/1345* (2006.01)

(52) U.S. Cl. ................. 349/152; 349/43; 349/151

(58) Field of Classification Search ............. 250/208.1; 257/777, 778, 781; 349/43, 56, 139, 141, 349/149, 150, 151, 152

See application file for complete search history.

(56) References Cited

U.S. PATENT DOCUMENTS

| 7,248,323 | B2 * | 7/2007 | Ahn et al. .............. 349/141 |
| 7,349,055 | B2 * | 3/2008 | Lee et al. .............. 349/152 |
| 2007/0045516 | A1 * | 3/2007 | Hong .............. 250/208.1 |
| 2007/0146518 | A1 * | 6/2007 | Hong et al. .............. 348/308 |
| 2007/0296659 | A1 * | 12/2007 | Kwak et al. .............. 345/87 |
| 2008/0001892 | A1 * | 1/2008 | Kim et al. .............. 345/97 |

* cited by examiner

*Primary Examiner*—John R Lee
(74) *Attorney, Agent, or Firm*—Cantor Colburn LLP

(57) ABSTRACT

An array substrate includes a base substrate, an input pad part, a first output part, a second output pad part, a pixel array, and a signal transmitting part. The input pad part and the first output pad part are disposed at the chip mounting area of the base substrate. The second output pad part is also disposed at the chip mounting area, but disposed within a layer different from the first output pad part. The pixel array is disposed at an array area of the array substrate. The signal transmitting part is disposed at a signal transmitting area of the array substrate. Therefore, the first and second output pad parts are disposed at different layers, respectively, so that a space utilizing efficiency of the array substrate is enhanced.

20 Claims, 8 Drawing Sheets

ARRAY SUBSTRATE AND DISPLAY APPARATUS HAVING THE SAME

This application claims priority to Korean Patent Application No. 2005-77609, filed on Aug. 24, 2005 and all the benefits accruing therefrom under 35 U.S.C. §119, and the contents of which in its entirety are herein incorporated by reference.

BACKGROUND OF THE INVENTION

1. Field of the Invention

The present invention relates to an array substrate and a display apparatus having the array substrate. More particularly, the present invention relates to an array substrate capable of achieving high resolution by enhancing a space utilizing efficiency and a display apparatus having the array substrate.

2. Description of the Related Art

Generally, a liquid crystal display ("LCD") apparatus includes an LCD panel that displays an image in response to a data signal and a gate signal, a data driver chip that outputs the data signal to the LCD panel, and a gate driver chip that outputs the gate signal to the LCD panel.

The LCD apparatus includes a data tape carrier package ("TCP") and a gate TCP. The data driver chip may be mounted on the data TCP, and the gate driver chip is mounted on the gate TCP through a chip-on-film ("COF") method. The data and gate TCPs are connected to the LCD panel through an outer-lead-bonding ("OLB") method.

Alternatively, the data and gate driver chips are directly mounted on the LCD panel through a chip-on-glass ("COG") method. That is, the data driver chip that is electrically connected to data lines of the LCD panel is mounted on a data side of the LCD panel, and the gate driver chip that is electrically connected to gate lines of the LCD panel is mounted on a gate side of the LCD panel through the COG method.

When the data and gate driver chips are mounted on the LCD panel in a COG method, a plurality of pads is formed on a chip mounting area of the LCD panel. The pads receive various signals from the data and gate driver chips. Recently, as a resolution of the LCD panel has been improved, a number of pads formed on a chip mounting area has also increased.

When a size or a number of the chip mounting area is increased in order to increase a number of the pads, a total size of the LCD panel has also increased. Therefore, a technique capable of increasing a number of the pads of the chip mounting area without increasing a size of the LCD panel is required.

BRIEF SUMMARY OF THE INVENTION

The present invention provides an array substrate capable of obtaining a high resolution by enhancing a space utilizing efficiency.

The present invention also provides a display apparatus having the above-mentioned array substrate.

In exemplary embodiments of the present invention, the array substrate includes a base substrate, an input pad part, a first output pad part, a second output pad part, a pixel array, and a signal transmitting part.

The base substrate has an array area, a signal transmitting area adjacent to the array area, and a chip mounting area adjacent to the signal transmitting area. The input pad part is disposed at a first portion of the chip mounting area, and receives a plurality of control signals externally provided. The first output pad part is disposed at a second portion of the chip mounting area. The second output pad part is also disposed at the chip mounting area, but within a layer different from the first output pad part. The pixel array is disposed at the array area, and the pixel array has a signal line part and a switching element electrically connected to the signal line part. The signal transmitting part is disposed at the signal transmitting area and electrically connects the signal line part and the first and second output pad parts.

In other exemplary embodiments of the present invention, the display apparatus includes a display panel and a driver chip. The display panel has an array substrate and an opposite substrate facing the array substrate, and displays an image. The driver chip is mounted on the array substrate to drive the display panel.

The array substrate includes a base substrate, an input pad part, a first output pad part, a second output pad part, a pixel array, and a signal transmitting part.

The base substrate has an array area, a signal transmitting area adjacent to the array area, and a chip mounting area adjacent to the signal transmitting area. The input pad part is disposed at a first portion of the chip mounting area. The input pad part receives a plurality of control signals from an external device. The first output pad part is disposed at a second portion of the chip mounting area. The second output pad part is also disposed at the chip mounting area of the base substrate, but within a layer that is different from that of the first output pad part. The pixel array is disposed at the array area. The pixel array has a signal line part and a switching element electrically connected to the signal line part. The signal transmitting part is disposed at the signal transmitting area. The signal transmitting part electrically connects the signal line part and the first and second output pad parts.

According to the array substrate and the display apparatus having the same, the first and second output pad parts are disposed at different layers, respectively, and the array substrate includes the output pads that are disposed adjacent to at least two imaginary lines among four imaginary lines that define a chip mounting area, so that a space utilizing efficiency of the array substrate is enhanced.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

Figure 1:
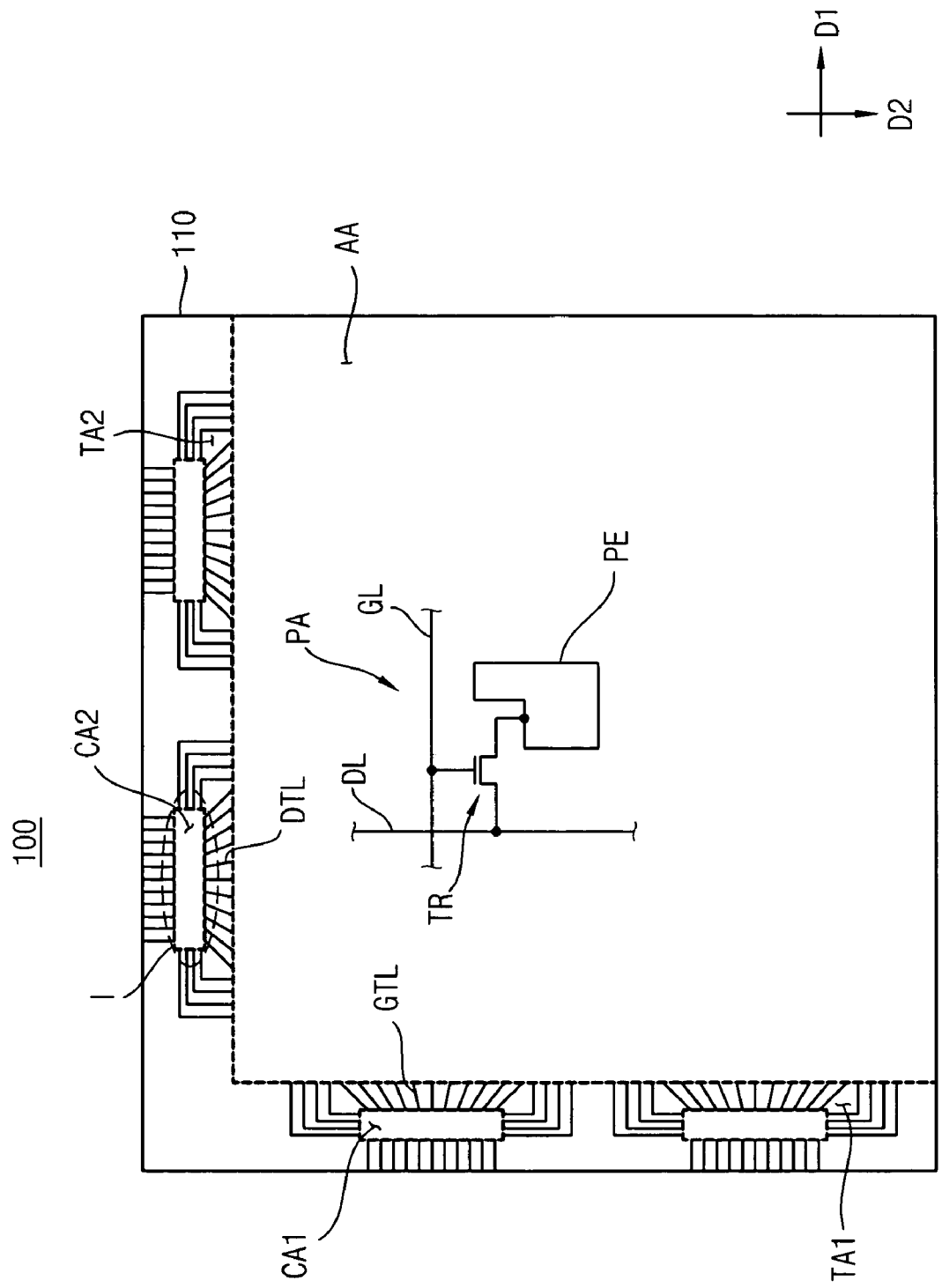
FIG. 1 is a plan view illustrating an exemplary embodiment of an array substrate according to the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected to or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
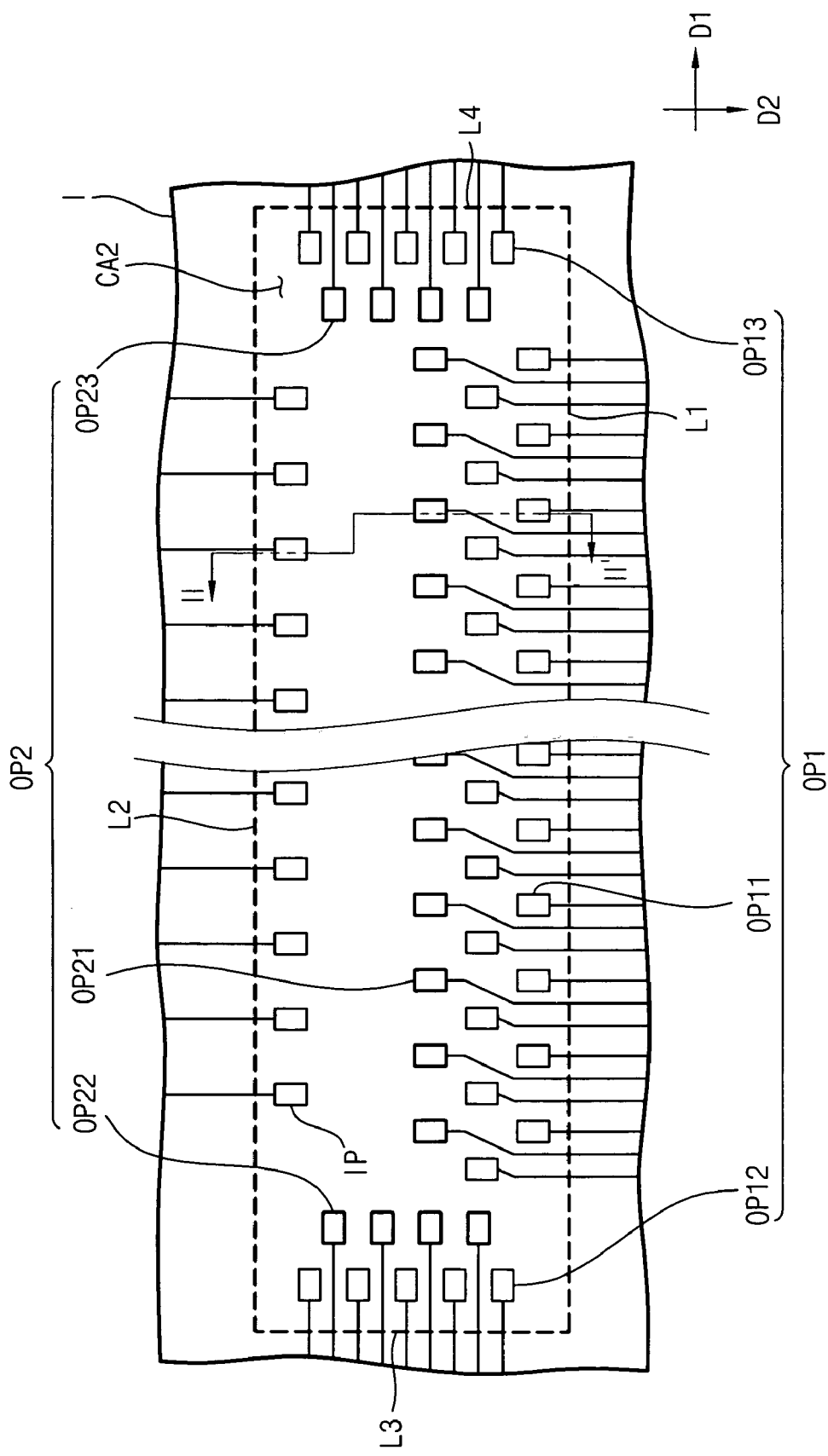
FIG. 2 is an enlarged view illustrating portion "I" in FIG. 1.

FIG. 1 is a plan view illustrating an exemplary embodiment of an array substrate according to the present invention. FIG. 2 is an enlarged view illustrating portion "I" in FIG. 1.

Referring to FIG. 1, the array substrate 100 includes a base substrate 110 and a pixel array PA.

The base substrate 110 includes an array area AA, a first signal transmitting area TA1, a second signal transmitting area TA2, a plurality of first chip mounting areas CA1 and a plurality of second chip mounting areas CA2. The array area AA may be generally rectangular having first, second, third, and fourth sides, where the first side is opposite the third side, and the second side is opposite the fourth side. The first and second signal transmitting areas TA1 and TA2 are adjacent to the array area AA. The first signal transmitting area TA1 may be adjacent to the first side of the array area AA, and the second signal transmitting area TA2 may be adjacent to the second side of the array area AA. The first chip mounting areas CA1 are adjacent to the first signal transmitting area TA1. The second chip mounting areas CA2 are adjacent to the second signal transmitting area TA2.

The pixel array PA includes a plurality of data lines DL and a plurality of gate lines GL, although only one data line DL and one gate line GL are illustrated for clarity. The gate lines GL are extended in a first direction D1, and the data lines DL are extended to a second direction D2 that is substantially perpendicular the first direction D1. The data lines DL and the gate lines GL are electrically insulated from each other, and the data lines DL and the gate lines GL cross with each other, so that the data lines DL and gate lines GL define a plurality of pixel areas that are arranged in a matrix shape. In other words, a pixel area is defined between an adjacent pair of gate lines GL and an adjacent pair of data lines DL.

The pixel array PA is formed in the array area AA. The pixel array PA includes a thin film transistor TR and a pixel electrode PE that are formed on each pixel area. Each thin film transistor TR is electrically connected to a data line DL and a gate line GL. The thin film transistor TR includes a gate electrode electrically connected to the gate line GL, a source electrode electrically connected to the data line DL, and a drain electrode electrically connected to the pixel electrode PE.

The gate lines GL have a first end adjacent the first side of the array area AA and a second end adjacent the third side of the array area AA. The first signal transmitting area TA1 is adjacent to the first end of the gate lines GL. The data lines DL have a first end adjacent the second side of the array area AA and a second end adjacent the fourth side of the array area AA. The second signal transmitting area TA2 is adjacent to the first end of the data lines DL. A plurality of gate transmitting lines GTL extended from the first end of the gate lines GL, respectively, is disposed in the first signal transmitting area TA1. Further, a plurality of data transmitting lines DTL extended from the first end of the data lines DL, respectively, is disposed in the second signal transmitting area TA2.

A plurality of gate driver chips (not shown) is mounted on the first chip mounting areas CA1, and a plurality of data driver chips (not shown) is mounted in the second chip mounting areas CA2. A plurality of pads is disposed in the first and second chip mounting areas CA1 and CA2.

An arrangement of the pads in the first chip mounting area CA1 is substantially to the same as an arrangement of the pads in the second chip mounting area CA2. Therefore, hereinafter an arrangement of the pads will be described in detail referring to FIG. 2 that shows an enlarged view of the second chip mounting area CA2.

Referring to FIG. 2, an input pad part IP, a first output pad part OP1, and a second output pad part OP2 are formed on the second chip mounting area CA2. The input pad part IP includes a plurality of input pads. The second chip mounting area CA2 has, for example, a rectangular shape defined by a first imaginary line L1, a second imaginary line L2, a third imaginary line L3, and a fourth imaginary line L4. The first and second imaginary lines L1 and L2 are extended in the first direction D1 that is substantially in parallel with the gate lines GL, the third and fourth imaginary lines L3 and L4 are extended in the second direction D2 that is substantially in parallel with the data lines DL. The first and second imaginary lines L1 and L2 are substantially equal to in length or longer than the third and fourth imaginary lines L3 and L4, respectively.

The first output pad part OP1 includes a plurality of first output pads OP11, a plurality of second output pads OP12, and a plurality of third output pads OP13. The first output pads OP11 are adjacent to the first imaginary line L1 in the first direction D1, and arranged in two lines. In other words, the first output pads OP11 include a first row of output pads adjacent to the first imaginary line L1, and a second row of output pads adjacent to the first row of output pads, where the second row of output pads is spaced a greater distance from the first imaginary line L1 than a distance between the first row of output pads and the first imaginary line L1. The first output pads OP11 may be arranged in a zigzag pattern. That is, while the first output pads OP11 are arranged in the first direction D1, alternating output pads are arranged in the first and second rows of output pads. The second and third output pads OP12 and OP13 are adjacent to the third and fourth imaginary lines L3 and L4 in the second direction D2, respectively.

The second output pad part OP2 is disposed at a different layer of the array substrate 100 from that of the first output pad part OP1. The second output pad part OP2 includes a plurality of fourth output pads OP21, a plurality of fifth output pads OP22, and a plurality of sixth output pads OP23. The fourth and first output pads OP21 and OP11 are disposed at first and second portions of the second chip mounting area CA2, respectively, and the fourth output pads OP21 are more closely disposed at a central portion of the second chip mounting area CA2 than the first output pads OP11 in the first direction D1. The fifth and sixth output pads OP22 and OP23 are disposed at third and fourth portions of the second chip mounting area CA2, respectively. The fifth and sixth output pads OP22 and OP23 are more closely disposed at a central portion of the chip mounting area than the second and third output pads OP12, OP13, respectively, in the second direction D2. In other words, the first output pads OP11 are arranged more closely to the first imaginary line L1 than the fourth output pads OP21, the second output pads OP12 are arranged more closely to the third imaginary line L3 than the fifth output pads OP22, and the third output pads OP12 are arranged more closely to the fourth imaginary line L4 than the sixth output pads OP23.

The input pad part IP that is adjacent to the second imaginary line L2 receives various control signals from an exterior device (not shown). The various control signals applied to the input pad part IP are applied to the data driver chip (not shown) that is mounted on the second chip mounting area CA2. Then, the first and second output pad parts OP1 and OP2 receive a data signal from the data driver chip. The first and second output pad parts OP1 and OP2 are electrically connected to a plurality of data transmitting lines DTL that are disposed at the second signal transmitting area TA2. Therefore, the data signals that are outputted from the first and second output pad parts OP1 and OP2 are applied to a plurality of data lines DL that are disposed at the array area AA via the data transmitting lines DTL.

Figure 3:
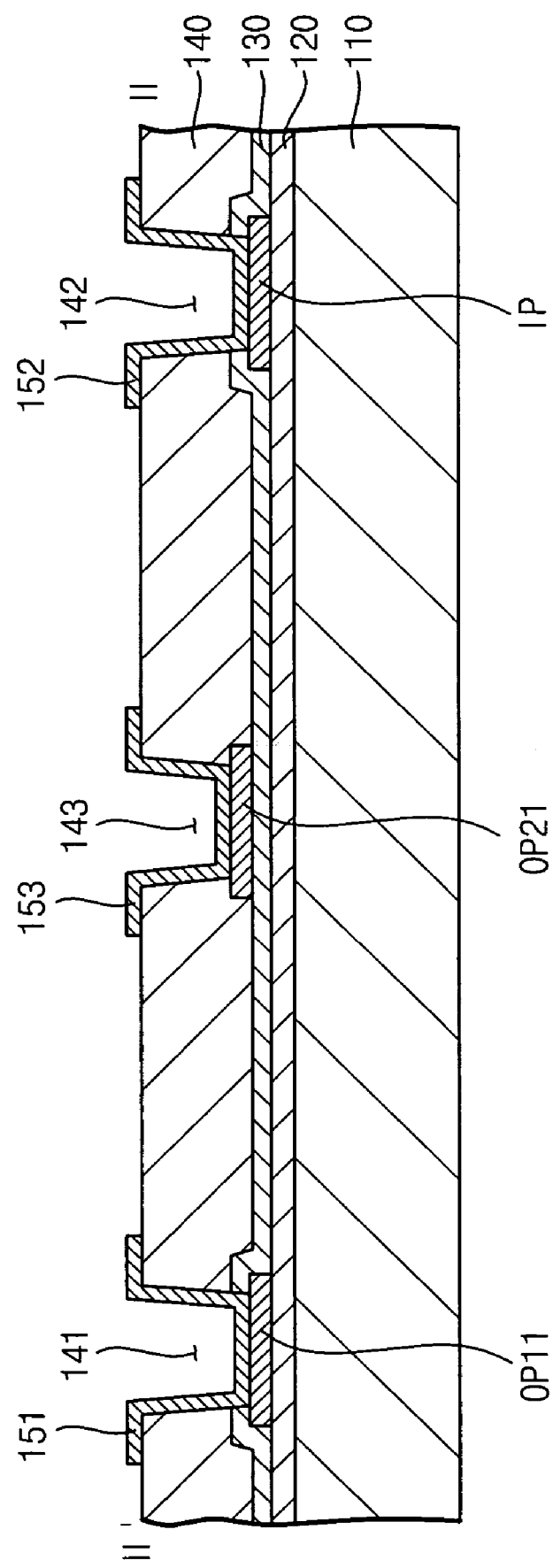
FIG. 3 is a cross-sectional view taken along line II-II' in FIG. 2.

FIG. 3 is a cross-sectional view taken along line II-II' in FIG. 2.

Referring to FIGS. 2 and 3, the gate insulating layer 120 is formed on the base substrate 110. The gate insulating layer 120 includes a silicon nitride layer or a silicon oxide layer. The gate insulating layer 120 covers a plurality of gate electrodes (not shown) and a plurality of gate lines GL (not shown) formed on the base substrate 110 in the array area AA in FIG. 1. The gate electrodes and the gate lines GL are formed from a first metal layer (not shown) that is formed on the base substrate 110. In other words, the first metal layer is patterned to form the gate electrodes and the gate lines, such as by a photolithography process.

In the illustrated embodiment, the first output pad OP11 and the input pad IP are formed on the gate insulating layer 120 within the second chip mounting area CA2. A plurality of data lines DL (not shown) and a plurality of source and drain electrodes (not shown) are also formed on the gate insulating layer 120, and are formed within the array area AA. The first output pad OP11 and the input pad IP are simultaneously formed from a second metal layer. In this embodiment, the data lines DL and the source and drain electrodes are also formed from the second metal layer. In other words, the second metal layer is patterned to form the first output pad OP11, the input pad IP, the data lines DL, the source electrode, and the drain electrode.

The first output pad OP11 and the input pad IP are covered by a passivation layer 130 and an organic insulating layer 140, respectively. For example, the organic insulating layer 140 is disposed on the passivation layer 130. First and second contact holes 141 and 142 are formed at the passivation layer 130 and the organic layer 140 to expose the first output pad OP11 and the input pad IP. First and second pad electrodes 151 and 152 are formed at the organic insulating layer 140. The first pad electrode 151 is electrically connected to the first output pad OP11 through the first contact hole 141. The second pad electrode 152 is electrically connected to the input pad IP through the second contact hole 142. For example, the first and second pad electrodes 151 and 152 include a transparent conductive material such as indium tin oxide ("ITO"), tin oxide ("TO"), indium zinc oxide ("IZO"), zinc oxide ("ZO"), indium tin zinc oxide ("ITZO"), etc.

The fourth output pad OP21 is disposed on the passivation layer 130 or the organic insulating layer 140. In either case, the fourth output pad OP21 is disposed at a different layer from the first output pad OP11, and likewise at a different layer from the input pad part IP. For example, the fourth output pad OP21 is formed from the second metal such as chromium (Cr), chromium-aluminum alloy (CrAl), molybdenum (Mo), molybdenum alloy, molybdenum-aluminum-molybdenum alloy (MoAlMo), copper (Cu), etc., but separated from the second metal layer which is formed into the first output pad OP11, the input pad IP, the data lines DL, the source electrode, and the drain electrode.

When the fourth output pad OP21 is disposed on the passivation layer 130, a third contact hole 143 is further formed at the organic layer 140 to expose the fourth output pad OP21. A third pad electrode 153 disposed on the organic layer 140 is electrically connected to the fourth output pad OP21 through the third contact hole 143.

Although not shown in FIG. 3, the fourth output pad OP21 may alternatively be formed from the first metal layer, and formed on the base substrate 110. In other words, in such an embodiment, the first metal layer is patterned to simultaneously form the fourth output pad OP21, the gate lines GL, and the gate electrodes, so that a number of masks for forming the array substrate 100 is decreased. Then, a contact hole is formed at the gate insulating layer 120, the passivation layer 130, and the organic insulating layer 140 to expose the fourth output pad OP21.

According to the present invention, a plurality of pads that are disposed in one chip mounting area of an array substrate 100 is disposed within two different layers, so that a number of pads may be increased without increasing a size of the chip mounting area. Therefore, a sufficient chip mounting area can be obtained, so that a space utilizing efficiency of the LCD panel having a high resolution is enhanced.

Figure 4:
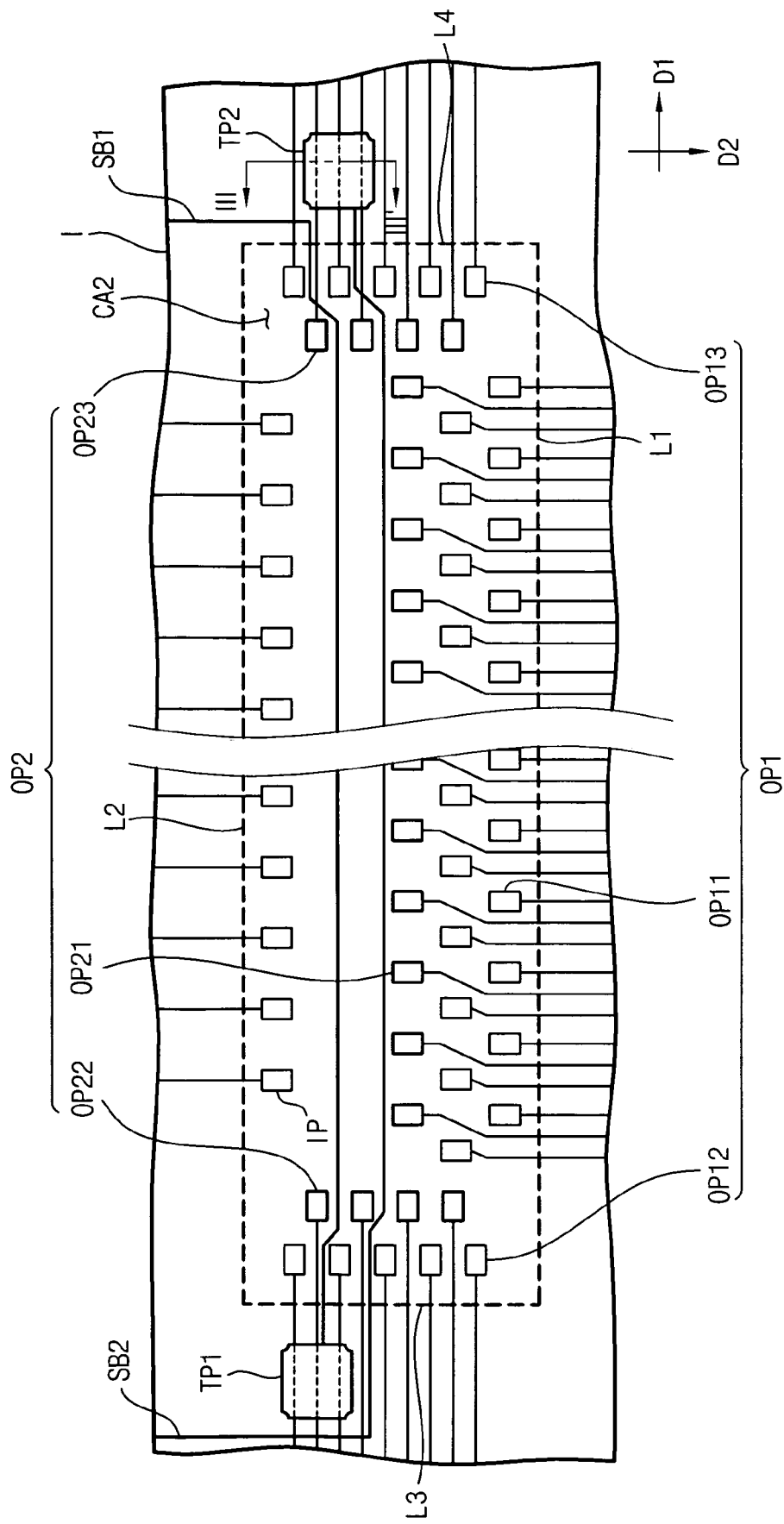
FIG. 4 is a partially enlarged view illustrating portion "I" in FIG. 1 of another exemplary embodiment of an array substrate according to the present invention.
Figure 5:
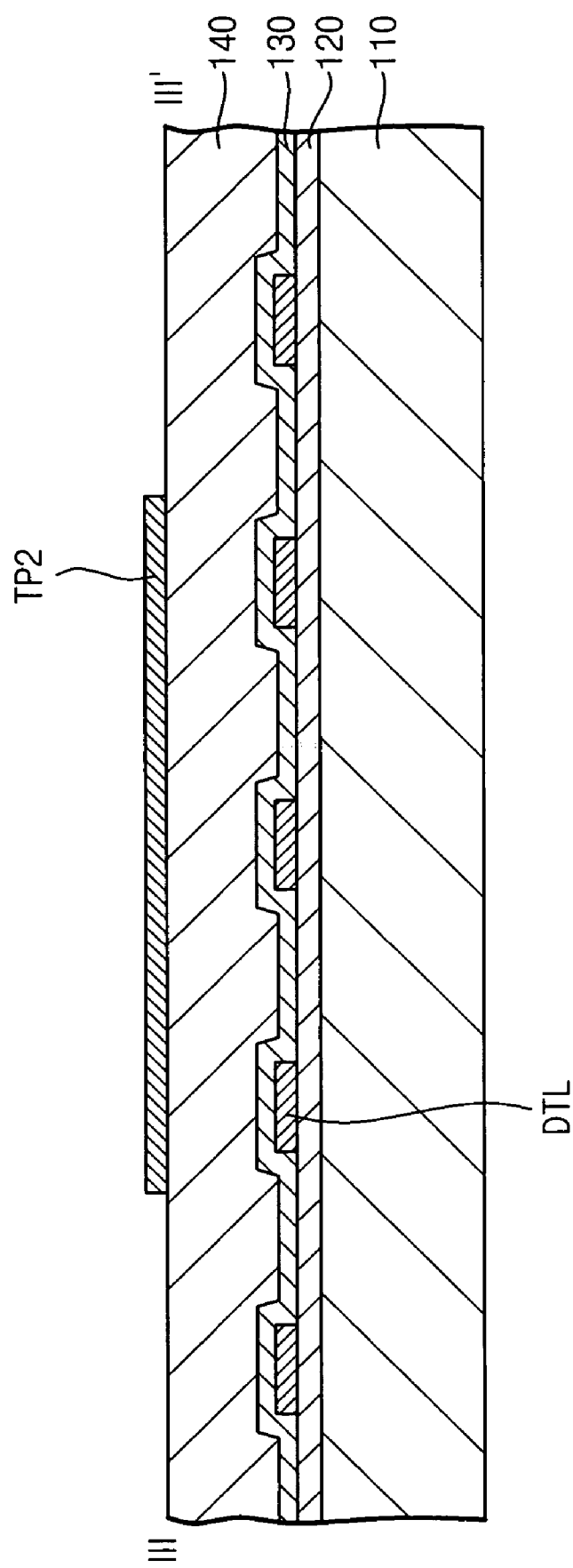
FIG. 5 is a cross-sectional view taken along line III-III' in FIG. 4.

FIG. 4 is a partially enlarged view illustrating portion "I" in FIG. 1 of another exemplary embodiment of an array substrate according to the present invention. FIG. 5 is a cross-sectional view taken along line III-III' in FIG. 4. The same reference numerals will be used to refer to the same or like parts in FIGS. 4 and 5 as those described in FIGS. 2 and 3, and any further explanations concerning the above elements will be omitted.

Referring to FIG. 4, the first and second test pads TP1 and TP2 are disposed at an outer side (or within the second signal transmitting area TA2 in FIG. 1) of third and fourth imaginary lines L3 and L4, respectively, that define the second chip mounting area CA2. The first test pad TP1 is electrically connected to a first electrostatic shorting bar SB1 that passes through the second chip mounting area CA2 and connects to each end portion of odd-numbered data lines DL that are disposed at the array area AA in FIG. 1. The second test pad TP2 is electrically connected to a second electrostatic shorting bar SB2 that passes through the second chip mounting area CA2 and electrically connects end portions of even-numbered data lines DL that are disposed at the array area AA. The first and second test pads TP1 and TP2 are arranged for receiving a test signal provided from an external device (not shown) so as to test the signal line, in this case the even-numbered or odd-numbered data lines DL, to which the test pads TP1 and TP2 are connected.

As shown in FIG. 5, the data transmitting lines DTL extended from the third and sixth output pads OP13 and OP23 are formed on the gate insulating layer 120 within the second signal transmitting area TA2 (shown in FIG. 1). The second test pad TP2, however, is formed on the organic insulating layer 140. Alternatively, the second test pad TP2 may be formed on the passivation layer 130.

As described above, the first and second test pads TP1 and TP2 are disposed on a different layer from a layer containing the data transmitting lines DTL, so that the first and second test pads TP1 and TP2 are electrically insulated from the data transmitting lines DTL. Therefore, although a space for the first and second output pad parts OP1 and OP2 is increased, a space for the first and second test pads TP1 and TP2 is not limited. As a result, a space utilizing efficiency for the array substrate may be improved.

Figure 6:
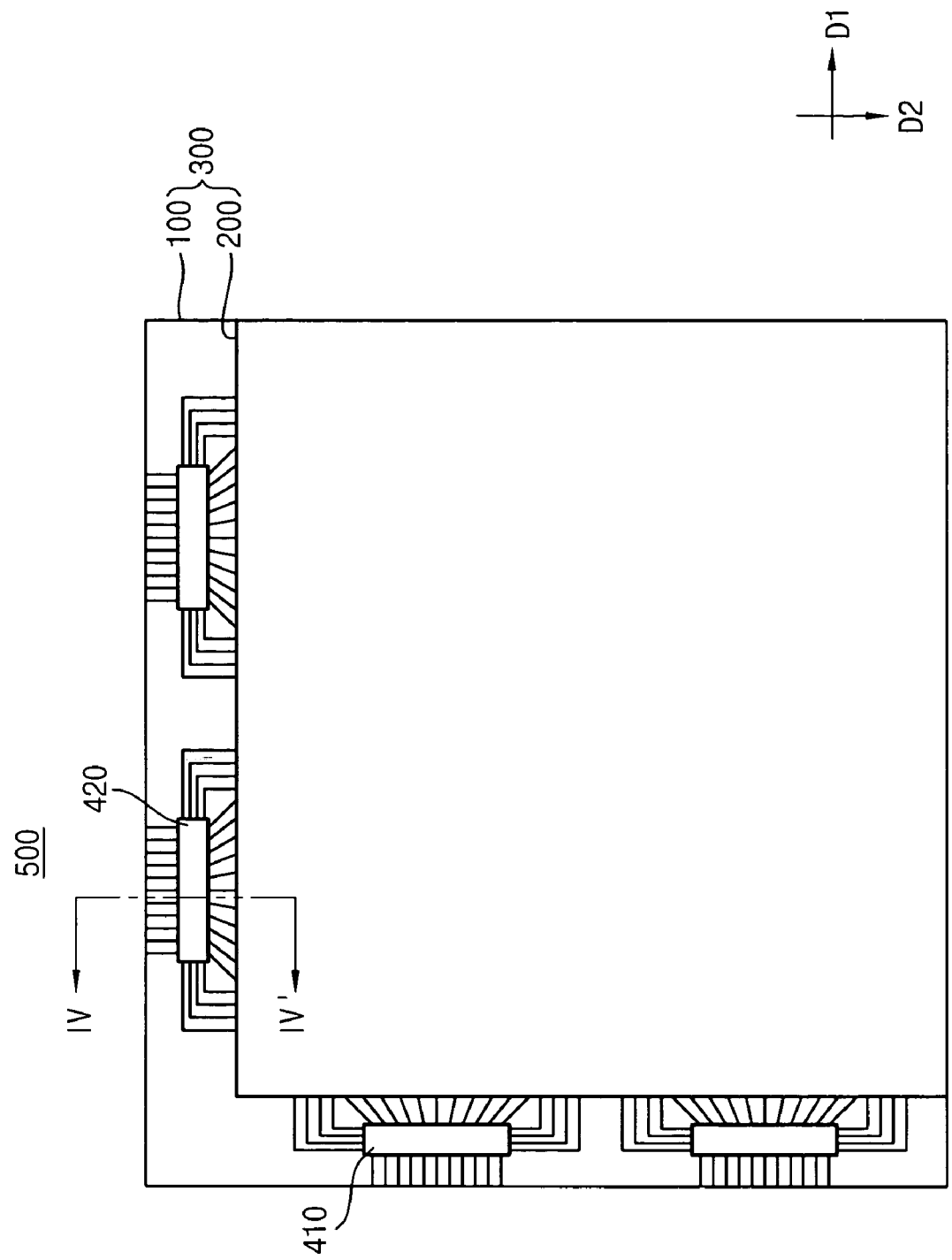
FIG. 6 is a plan view illustrating another exemplary embodiment of a display apparatus according to the present invention.

FIG. 6 is a plan view illustrating another exemplary embodiment of a display apparatus according to the present invention. The same reference numerals will be used to refer to the same or like parts in FIG. 6 as those described in FIG. 1, and any further explanations concerning the above elements will be omitted.

Referring to FIG. 6, a display apparatus 500 includes a display panel 300, a gate driver chip 410 that applies a gate signal to the display panel 300, and a data driver chip 420 that applies a data signal to the display panel 300. The display panel 300 includes an array substrate 100, an opposite substrate 200 facing the array substrate 100, and a liquid crystal layer (not shown) interposed between the array substrate 100 and the opposite substrate 200. The opposite substrate 200 may be a color filter substrate including, but not limited to, a common electrode (not shown) and a color filter (not shown). When the common electrode and the pixel electrode PE (shown in FIG. 1) are provided with a voltage, the liquid crystal molecules within the liquid crystal layer alter an aligning angle thereof, thereby changing an image on the liquid crystal display panel.

The gate driver chip 410 is mounted on the first chip mounting area CA1 (shown in FIG. 1) of the array substrate 100, and the data driver chip 420 is mounted on the second chip mounting area CA2 (shown in FIG. 1). The gate driver chip 410 outputs the gate signal in response to various control signals provided from an external device, and the data driver chip 420 outputs the data signal in response to various control signals from an external device.

Hereinafter, an arrangement of a bump pattern formed in the data driver chip 420 and a combination structure between the data driver chip 420 and the array substrate 100 will be described with reference to FIGS. 7 and 8. A description of the gate driver chip 410 will be omitted because an arrangement of a bump pattern disposed in the gate driver chip 410 is substantially the same as an arrangement of a bump pattern disposed in the data driver chip 420, and a combining method of the gate driver chip 410 is substantially the same as a combining method of the data driver chip 420.

Figure 7:
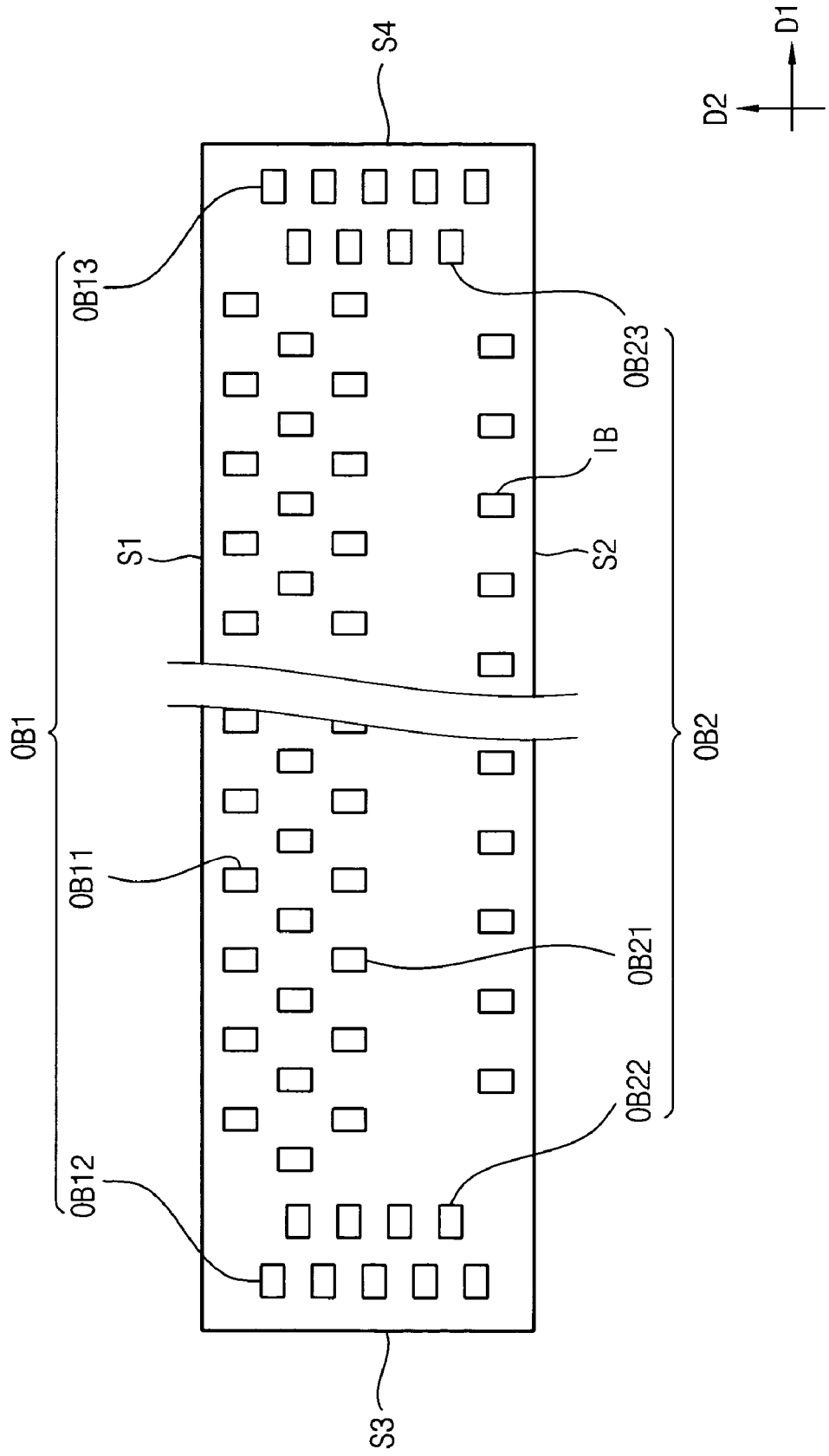
FIG. 7 is a plan view illustrating a backside of the exemplary data driver chip in FIG. 6.

FIG. 7 is a plan view illustrating a rear side of the exemplary data driver chip in FIG. 6. FIG. 8 is a cross-sectional view taken along line IV-IV' in FIG. 6.

Referring to FIGS. 6 and 7, a first output bump part OB1 and a second output bump part OB2 are disposed at a rear surface of the data driver chip 420. The rear surface of the data driver chip 420 faces the second chip mounting area CA2 shown in FIG. 1. The rear surface of the data driver chip 420 has, for example, a rectangular shape. First and second sides S1 and S2 of the rear surface are substantially in parallel with a first direction D1, and third and fourth sides S3 and S4 are substantially in parallel with a second direction D2. The first side S1 is substantially in parallel with the second side S2, and the third side S3 is substantially in parallel with the fourth side S4. For example, the first direction D1 is substantially perpendicular to the second direction D2, such that the third and fourth sides S3 an S4 are substantially perpendicular to the first and second sides S1 and S2. When the data driver chip 420 is mounted on the second chip mounting area CA2, as will be further described below with respect to FIG. 8, the first side S1, second side S2, third side S3, and fourth side S4 of the data driver chip 420 correspond to the first imaginary line L1, second imaginary line L2, third imaginary line L3, and fourth imaginary line L4, respectively, of the second chip mounting area CA2 shown in FIG. 1.

The first output bump part OB1 includes a plurality of first output bumps OB11, a plurality of second output bumps OB12, and a plurality of third output bumps OB13 all positioned on the rear surface of the data driver chip 420. The first output bumps OB11 that are adjacent to the first side S1 are arranged in the first direction D1, and arrayed in two lines. In other words, the first output bumps OB11 include a first row of output bumps adjacent to the first side S1, and a second row of output bumps adjacent to the first row of output bumps, where the second row of output bumps is spaced a greater distance from the first side S1 than a distance between the first row of output bumps and the first side S1. The first output bumps OB11 may be arranged in a zigzag pattern. That is, while the first output bumps OB11 are arranged in the first direction D1, alternating output bumps are arranged in the first and second rows of output bumps. The second and third output bumps OB12 and OB13 are adjacent to the third and fourth sides S3 and S4, respectively, and arranged in the second direction D2.

The second output bump part OB2 includes a plurality of fourth output bumps OB21, a plurality of fifth output bumps OB22, and a plurality of sixth output bumps OB23. The fourth output bumps OB21 are more closely disposed at a central portion of the rear surface of the data driver chip 420 than the first output bumps OB11, and arranged in the first direction D1. Each of the fifth and sixth output bumps OB22 and OB23 is more closely disposed to a central portion of the rear surface of the data driver chip 420 than the second and third output bumps OB12 and OB13, and arranged in the second direction D2. Also, an input bump IB is disposed adjacent to the second side S2 of the rear surface of the data driver chip 420.

Figure 8:
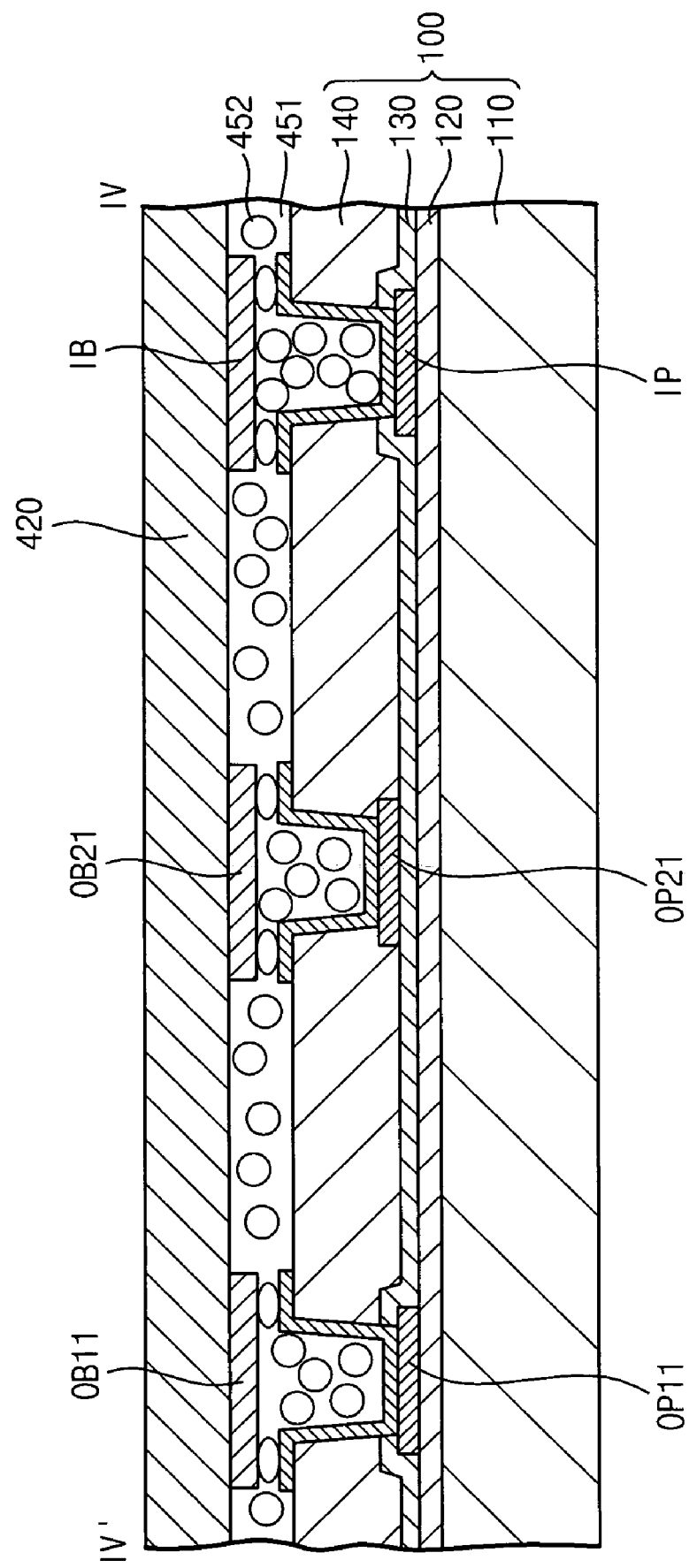
FIG. 8 is a cross-sectional view taken along line IV-IV' in FIG. 6.

As shown in FIGS. 7 and 8, an anisotropic conductive film ("ACF") 450 is interposed between the data driver chip 420 and the array substrate 100 so as to secure the data driver chip 420 to the second chip mounting area CA2 of the array substrate 100. The ACF 450 includes an adhesive layer 451 and a plurality of conductive particles 452 disposed in the adhesive layer 451. When the data driver chip 420 and the array substrate 100 are heated and compressed together, with the ACF 450 disposed therebetween, the data driver chip 420 is secured to the array substrate 100 through the ACF 450. A data signal outputted from the data driver chip 420 is applied to the array substrate 100 through the conductive particles 452. In particular, the input bump IB of the data driver chip 420 is electrically connected to an input pad part IP of the array substrate 100, and the first and second output bump parts OB1 and OB2 of the data driver chip 420 are electrically connected to the first and second output pad parts OP1 and OP2 of the array substrate 100, respectively.

The input pad part IP on the array substrate 100 receives various control signals from an external device, and transmits the various control signals to the input bump IB of the data driver chip 420 through the ACF 450. The data driver chip 420 generates a data signal in response to the various control signals. The data signal is applied to the first and second output pad parts OP1 and OP2 through the first and second output bump parts OB1 and OB2 via the ACF 450. Then, the data signal is applied to the data line DL (shown in FIG. 1) of the array substrate 100 through the data transmitting line DTL (shown in FIG. 1). Thus, the data driver chip 420 is mounted on the array substrate 100 as described in FIGS. 1 to 8. Similarly, the gate driver chip 410 (shown in FIG. 6) is mounted on the array substrate 100 within the first chip mounting area CA1 (shown in FIG. 1) via the ACF 450. Although not shown in the figures, a gate driving part outputting a gate signal may be formed at the array substrate 100 through a process of forming the pixel array PA (shown in FIG. 1). Further, the data driver chip 420 that is illustrated as divided into multi-parts may instead be integrated into one chip.

According to the array substrate and the display apparatus having the array substrate, the first and second output pad parts are disposed at different layers, respectively, of the array substrate. In addition, the array substrate includes the output pads that are disposed adjacent to at least two imaginary lines among four imaginary lines that define a chip mounting area.

Therefore, a space utilizing efficiency of the array substrate is enhanced, so that a high resolution may be obtained without increasing a size of the array substrate.

Although the exemplary embodiments of the present invention have been described, it is understood that the present invention should not be limited to these exemplary embodiments but various changes and modifications can be made by one of ordinary skill in the art within the spirit and scope of the present invention as hereinafter claimed.

What is claimed is:

1. An array substrate comprising:
    a base substrate having an array area, a signal transmitting area adjacent to the array area and a chip mounting area adjacent to the signal transmitting area;
    an input pad part disposed at a first portion of the chip mounting area, and receiving a plurality of control signals from an external device;
    a first output pad part disposed at a second portion of the chip mounting area;
    a second output pad part disposed at the chip mounting area, and disposed within a layer of the array substrate that is different from a layer of the array substrate containing the first output pad part;
    a pixel array disposed at the array area, the pixel array having a signal line part and a switching element electrically connected to the signal line part; and
    a signal transmitting part disposed at the signal transmitting area, the signal transmitting part electrically connecting the signal line part to the first and second output pad parts.

2. The array substrate of claim 1, wherein the input pad part and the first output pad part are disposed within a same layer of the array substrate.

3. The array substrate of claim 1, wherein the first output pad part is formed on one of the base substrate and a first insulating layer formed on the base substrate, and
    the second output pad part is formed on a second insulating layer covering the first output pad part.

4. The array substrate of claim 1, wherein the chip mounting area has a rectangular shape defined by first, second, third and fourth imaginary lines, and the input pad part is adjacent to the first imaginary line, the first and second output pad parts are adjacent to at least two of the imaginary lines among the second to fourth imaginary lines.

5. The array substrate of claim 4, wherein the first output pad part comprises:
    at least one first output pad adjacent to the second imaginary line along a first direction;

at least one second output pad adjacent to the third imaginary line along a second direction that is substantially perpendicular to the first direction; and at least one third output pad adjacent to the fourth imaginary line along the second direction.

6. The array substrate of claim 5, wherein the at least one first output pad includes a plurality of first output pads arranged along two lines.

7. The array substrate of claim 6, wherein the two lines includes a first row of first output pads positioned closer to the second imaginary line than a second row of first output pads.

8. The array substrate of claim 7, wherein the first output pads in the first and second rows of first output pads are alternatingly arranged in a zigzag pattern.

9. The array substrate of claim 4, wherein the second output pad part comprises:
   at least one fourth output pad adjacent to the second imaginary line along the first direction;
   at least one fifth output pad adjacent to the third imaginary line along the second direction; and
   at least one sixth output pad adjacent to the fourth imaginary line along the second direction.

10. The array substrate of claim 9, wherein the fourth output pad is disposed closer to a central portion of the chip mounting area than the first output pad.

11. The array substrate of claim 4, wherein the first and second output pad parts are disposed at first and second portions of the chip mounting area, respectively, and the second portion of the chip mounting area is more closely disposed next to a central portion of the chip mounting area than the first portion of the chip mounting area.

12. The array substrate of claim 4, wherein the signal transmitting part comprises:
   a first transmitting line electrically connected to the first output pad part; and
   a second transmitting line electrically connected to the second output pad part.

13. The array substrate of claim 12, further comprising a test pad electrically connected to the signal line part, and receiving a test signal provided from an external device to test the signal line part.

14. The array substrate of claim 13, wherein the test pad is disposed at an outer side portion of the chip mounting area adjacent to the third and fourth imaginary lines, and disposed within a layer of the array substrate different from that of the first and second transmitting lines to be electrically insulated from the first and second transmitting lines.

15. The array substrate of claim 1, wherein the signal line part includes a gate line and a data line, the data line separated from the gate line by a gate insulating layer, wherein at least one of the first output pad part and the second output pad part is formed within a same layer as the data line or the gate line.

16. The array substrate of claim 15, wherein the first output pad part is formed within a same layer as the data line.

17. A display apparatus comprising:
   a display panel having an array substrate and an opposite substrate facing the array substrate, and displaying an image; and
   a driver chip mounted on the array substrate driving the display panel, wherein the array substrate comprises,
      a base substrate having an array area, a signal transmitting area adjacent to the array area and a chip mounting area adjacent to the signal transmitting area;
      an input pad part disposed at a first portion of the chip mounting area, and receiving a plurality of control signals from an external device;
      a first output pad part disposed at a second portion of the chip mounting area;
      a second output pad part disposed at the chip mounting area of the base substrate, and disposed within a layer of the array substrate that is different from a layer of the array substrate containing the first output pad part;
      a pixel array disposed at the array area, the pixel array having a signal line part and a switching element electrically connected to the signal line part; and
      a signal transmitting part disposed at the signal transmitting area, the signal transmitting part electrically connected to the signal line part and the first and second output pad parts.

18. The display apparatus of claim 17, wherein the driver chip comprises:
   an input bump part electrically connected to the input pad part;
   a first output bump part electrically connected to the first output pad part; and
   a second output bump part electrically connected to the second output pad part.

19. The display apparatus of claim 18, further comprising an anisotropic conductive film electrically connecting the input bump part, the first output bump part, and the second output bump part of the driver chip to the input pad part, the first output pad part, and the second output pad part.

20. The display apparatus of claim 19, wherein the driver chip has a rectangular shape defined by first, second, third and fourth sides corresponding to first, second, third and fourth imaginary lines of the chip mounting area of the base substrate, respectively, and
   the input bump part is adjacent to the first side, the first and second output bump parts adjacent to at least two sides among the second to fourth sides of the driver chip.

* * * * *